United States Patent [19]

Edmonds, Jr. et al.

[11] 4,371,706

[45] Feb. 1, 1983

[54] PREPARATION OF ALKALI METAL AMINOALKANOATES

[75] Inventors: James T. Edmonds, Jr.; Lacey E. Scoggins, both of Bartlesville, Okla.

[73] Assignee: Phillips Petroleum Company, Bartlesville, Okla.

[21] Appl. No.: 315,072

[22] Filed: Oct. 22, 1981

Related U.S. Application Data

[62] Division of Ser. No. 147,407, May 6, 1980, Pat. No. 4,324,886.

[51] Int. Cl.$^3$ .............................................. C07C 99/06
[52] U.S. Cl. ................................ 562/553; 260/404; 562/433; 562/443; 562/504; 562/507; 562/576
[58] Field of Search .............. 562/553, 443, 433, 504, 562/507, 576; 260/404

[56] References Cited

U.S. PATENT DOCUMENTS

| | | | |
|---|---|---|---|
| 2,327,119 | 8/1943 | Martin | 562/553 |
| 3,450,752 | 6/1969 | Inklaar | 260/534 |
| 3,655,748 | 4/1972 | Tandara | 562/553 |
| 3,867,356 | 2/1975 | Campbell | 260/79.1 |
| 3,884,884 | 5/1975 | Scoggins et al. | 260/79.1 |
| 3,919,177 | 11/1975 | Campbell | 260/79.1 |
| 4,060,520 | 11/1977 | Irvin | 260/79.1 |
| 4,064,114 | 12/1977 | Edmonds, Jr. | 260/79.1 |

FOREIGN PATENT DOCUMENTS

| | | | |
|---|---|---|---|
| 820439 | 11/1951 | Fed. Rep. of Germany | |
| 56-39050 | 4/1981 | Japan | 562/553 |
| 56-39052 | 4/1981 | Japan | 562/553 |
| 1021329 | 3/1966 | United Kingdom | 562/553 |
| 1477726 | 6/1977 | United Kingdom | |

OTHER PUBLICATIONS

Tafel, Ber., 22, pp. 1860–1865 (1889).
Tafel, Ber., 40, pp. 2831–2841 (1907).

*Primary Examiner*—Michael L. Shippen

[57] ABSTRACT

Alkali metal aminoalkanoate is prepared by contacting in the presence of an alkali metal carboxylate a reaction mixture in which there is at least one alkali metal hydroxide, at least one lactam, and water. Arylene sulfide polymer is prepared by contacting at polymerization conditions a reaction mixture that contains at least one alkali metal aminoalkanoate prepared as described above; at least one polyhalo-substituted aromatic compound; at least one organic amide as solvent and $H_2S$. In an embodiment of the polymerization the organic amide used as solvent can be the same as the lactam from which the alkali metal aminoalkanoate was produced.

4 Claims, No Drawings

PREPARATION OF ALKALI METAL AMINOALKANOATES

This application is a divisional application of my copending application Ser. No. 147,407 filed May 6, 1980 now U.S. Pat. No. 4,324,886.

BACKGROUND OF THE INVENTION

This invention relates to the preparation of polymers of arylene sulfide. In one of its aspects it relates to the preparation of an alkali metal aminoalkanoate. In another aspect it relates to a batch or continuous process for preparing poly(arylene sulfide) using alkali metal aminoalkanoate preformed in a catalyzed reaction.

Processes for producing poly(arylene sulfide) in which an alkali metal aminoalkanoate is preformed and reacted with other chemical compounds are well known. The improvement of such a process to facilitate adaptation to either a batch or continuous production of poly(arylene sulfide) is a vital commercial concern. The present inventive process provides a means for decreasing the time required for producing alkali metal aminoalkanoates and also provides means by which a continuous production of poly(arylene sulfide) can be obtained. Of particular interest in the present invention is means for providing a continuous process for more rapidly producing a preformed alkali metal aminoalkanoate and using the reaction-product mixture from this preforming directly in a polymerization process for producing poly(arylene sulfide) with hydrogen sulfide as the sulfur source in the process. This combination of features imbues the process with an exceptional commercial potential.

It is therefore an object of this invention to provide a catalyzed preparation of alkali metal aminoalkanoate. It is another object of this invention to provide a homogeneous solution of alkali metal aminoalkanoate in excess organic amide. It is still another object of this invention to provide an alkali metal aminoalkanoate solution containing its preparation catalyst suitable for use in batch or continuous production of poly(arylene sulfide).

Other objects, aspects, and the various advantages of the invention will become apparent upon reading the specification and the appended claims.

STATEMENT OF THE INVENTION

According to this invention a method is provided for producing an alkali metal aminoalkanoate by reacting an alkali metal hydroxide, water, and lactam in the presence of an alkali metal carboxylate. The presence of the alkali metal carboxylate speeding the formation of the aminoalkanoate compound as compared to a process without the alkali metal carboxylate.

Further according to the invention a method is provided for producing polymer comprising contacting at polymerization conditions a reaction mixture comprising the alkali metal aminoalkanoate produced, at least one polyhalo-substituted aromatic compound, $H_2S$, and at least one organic amide as a solvent and maintaining said reaction mixture at polymerization conditions for a time sufficient to produce polymer. Optionally alkali metal carboxylate is present in the polymerization reaction mixture.

The alkali metal aminoalkanoates can be represented by the formula $RNH(CR_2)_nCO_2M$ where each R is selected from among hydrogen, and hydrocarbyl radicals selected from alkyl, cycloalkyl, aryl, and combinations in which the number of carbon atoms in each of the radicals ranges from 1 to about 12, M is an alkali metal selected from sodium, potassium, rubidium, and cesium, n is an integer of 1 to about 12, and the total number of carbon atoms in each molecule of the alkali metal aminoalkanoate is 3 to about 24.

Examples of alkali metal aminoalkanoates which can be produced from organic amides, particularly lactams, include sodium 3-aminopropionate, sodium 4-aminobutyrate, potassium, 5-aminovalerate, rubidium 6-aminohexanoate, sodium N-methyl-4-aminobutyrate, cesium N-ethyl-5-aminovalerate, potassium N-isopropyl-6-aminohexanoate, potassium N-dodecyl-2-octyl-4-aminobutyrate, sodium N-cyclopentyl-3-dodecyl-5-aminovalerate, rubidium N-phenyl-2-butyl-3-benzyl-4-aminobutyrate, sodium N-m-tolyl-3-aminopropionate, potassium N-benzyl-3-o-tolyl-5-aminovalerate, cesium 2-phenyl-4-aminobutyrate, sodium N-butyl-4-cyclohexyl-7-methyl-8-aminooctanoate, sodium N-octyl-3-ethyl-5-isopropyl-7-aminoheptanoate, potassium 10-aminodecanoate, rubidium 13-aminotridecanoate, and the like, and mixtures thereof.

In the preparation of the alkali metal aminoalkanoate from lactam and alkali metal hydroxide, using from about 1 to about 6.5 gram-moles of water per gram-mole of alkali metal hydroxide, the lactam generally will be employed in an amount within the range of from about 1.5 to about 8 gram-moles per gram-mole of alkali metal hydroxide. The reaction temperature should be sufficient to permit distillation of water from the mixture at substantially atmospheric pressure without substantial distillation of lactam. Although the reaction temperature will depend in part on the lactam employed, it generally will be within the range of from about 120° C. to about 210° C. The reaction time will depend in part on the reaction temperature but generally will be within the range of from about 5 minutes to about 6 hours. The reaction and distillation of water are most conveniently conducted at substantially atmospheric pressure.

Examples of some lactams which can be employed to produce alkali metal aminoalkanoates include 2-azetidinone, 2pyrrolidone, 2-piperidone, ε-caprolactam, N-methyl-2-pyrrolidone, N-ethyl-2-piperidone, N-isopropyl-ε-caprolactam, N-dodecyl-3-octyl-2-pyrrolidone, N-cyclopentyl-4-dodecyl-2-piperidone, N-phenyl-3-butyl-4-benzyl-2-pyrrolidone, N-m-tolyl-2-azetidinone, N-benzyl-4-o-tolyl-2-piperidone, 3-phenyl-2-pyrrolidone, lactam of N-butyl-4-cyclohexyl-7-methyl-8-aminooctanoic acid, lactam of N-octyl-3-ethyl-5-isopropyl-7-aminoheptanoic acid, lactm of 10-aminodecanoic acid, lactam of 13-aminotridecanoic acid, and the like, and mixtures thereof. An excess of the lactam employed in producing alkali metal aminoalkanoate can be used along with the alkanoate in the production of arylene sulfide polymer.

The alkali metal carboxylates which can be employed in preforming the alkali metal aminoalkanoates can be represented by the formula $R_3CO_3M_1$ and $R_3$ is a hydrocarbyl radical selected from among alkyl, cycloalkyl, aryl, and combinations thereof, said radicals having from 1 to about 20 carbon atoms, and $M_1$ is an alkali metal selected from lithium, sodium, potassium, rubidium, and cesium, preferably sodium. A presently preferred alkali metal carboxylate is sodium acetate because of ready availability in pure form, low cost, and efficacy in the preforming process.

In the preforming reaction to produce the alkali metal aminoalkanoate from the lactam, alkali metal hydroxide, water, and alkali metal carboxylate, a wide range of ratios of reactants can be used. For most practical operation the ratios of the other components expressed as moles of component per mole of alkali metal hydroxide are as follows:

| Component | Broad Range | Preferred Range |
|---|---|---|
| Water | 1 to 6.5 | 1.5 to 5 |
| Lactam | 1.5 to 8 | 1.5 to 5 |
| Alkali Metal Carboxylate | 0.05 to 1 | 0.07 to 0.6 |

In a preferred embodiment, sodium N-methyl-4-aminobutyrate (SMAB) is formed by reacting sodium hydroxide, water, and N-methyl-2-pyrrolidone in the presence of sodium acetate. Typically, about a 50/50 weight ratio of water to sodium hydroxide is employed which corresponds to a $H_2O:NaOH$ molar ratio of about 2.2:1. After formation of the SMAB, the mixture is dehydrated by distillation at atmospheric pressure to give a homogeneous solution suitable as a feedstock in a polymerization process, i.e., the free water remaining in the solution is removed to obtain a homogeneous solution.

p-Dihalobenzenes which can be employed in the process of this invention can be represented by the formula

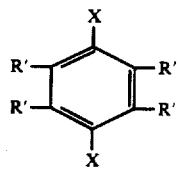

where each X is selected from the group consisting of chlorine, bromine, and iodine, and each R' is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R' must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, ;b 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

The organic acids used as the reaction medium in the arylene sulfide polymerization method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof. N-methyl-2-pyrrolidone is preferred.

Alkali metal hydroxides which can be employed in the presence of this invention includes lithium hydroxide, sodium hydroxide, potassium hydroxide, rubidium hydroxide, cesium hydroxide, and mixtures thereof.

The alkali metal carboxylates useful in the polymerization process can be chosen from those named above as useful in preforming alkali metal aminoalkanoates. One of the advantages of the present invention is that alkali metal carboxylate present from the formation of aminoalkanoate assures the production of polymer of molecular weight that is increased as compared to that produced with no alkali metal carboxylate present. Additional carboxylate is optionally made a part of the polymerization reaction mixture to assure additional increase of molecular weight of polymer produced.

Although a wide range of ratios of reactants can be used the practical mole ratios of the various components employed in the polymerization process expressed as moles of component per mole of hydrogen sulfide are as follows:

| Component | Broad Range | Preferred Range |
|---|---|---|
| Alkali Metal Aminoalkanoate | 2 to 2.3 | 2 to 2.15 |
| Organic Amide | 1 to 10 | 2 to 5 |
| Polyhalo-Substituted Aromatic Compound | 0.99 to 1.1 | 0.99 to 1.05 |
| Alkali Metal Carboxylate (optional) | 0.1 to 1.5 | 0.1 to 1 |

The polymerization conditions employed in producing the arylene sulfide polymers can be those well known in the art. Reaction temperatures can range from about 125° to 450° C., preferably from about 175° to 350° C. The reaction time can range from about 10 minutes to about 3 days, preferably from about 1 hour to about 8 hours.

EXAMPLE I

In a 0.5 liter flask at 49° C. were charged 80 g (2.0 moles) of sodium hydroxide pellets, 80 g (4.4 moles) of water, $H_2O/NaOH$ mole ratio of 2.2 and 386 mL (4.0 moles) of N-methyl-2-pyrrolidone, mole ratio NMP/NaOH of 2.0. The mixture was heated with agitation at a constant rate (powerstat setting of 120) under a slow nitrogen flow for the entire run. After 12 minutes the temperature of the two phase mixture reached the boiling point (147° C.). After 35 minutes had elapsed in the run the temperature of the mixture declined to 133° C. as a single phase started to form. After the mixture remained at 133° C. for 22 minutes liquid was taken off overhead after 70 minutes into the run thereafter collection of 90 mL over a 23 minute period. The final temperature reached was 188° C. with a total run length of 93 minutes. as the single phase reaction composition cooled to about 154° C., the contents began to solidify.

EXAMPLE II

Into a reaction apparatus identical to that employed in Example I at 49° C. was charged 80 g (2.0 moles) of sodium hydroxide pellets, 80 g (4.4 moles) of water, $H_2O/NaOH$ mole ratio of 2.2, 386 mL (4.0 moles) of N-methyl-2-pyrrolidone, mole ratio NMP/NaOH of 2 and 12 g (0.15 moles) of anhydrous sodium acetate (NaOAc) mole ratio NaOAc/NaOH of 0.075. The mixture was heated under the same conditions as in Example I. After 14 minutes the temperature of the two phase mixture reached the boiling point (148° C.). After 15 more minutes into the run the temperature of the mixture declined to 134° C. as a single phase was starting to form. After the mixture remained at about 134° C. for 20 minutes liquid was taken off overhead after only 49 minutes into the run until 90 mL had been collected over a 22 minute period. The final temperature reached was 188° C. with a total run length of 71 minutes. As before, when the single phase reaction composition cooled to about 154° C., it began to solidify.

In comparing the results of Examples I and II it is clearly seen the presence of sodium acetate shortened the total run time from 93 minutes (control in Example 1) to 71 minutes (invention in Example 2). The savings in time represents an appreciable savings in power consumption and thereby provides a more economical process.

EXAMPLE III

A production of SMAB was carried out in a two gallon (7.6 liter) stirred autoclave by charging to it at room temperature 3081 g (31.1 moles) of N-methyl-2-pyrrolidone, 667.7 g (16.7 moles) of sodium hydroxide pellets, 636 g (7.75 moles) of anhydrous sodium acetate, and 666 g (37 moles) of deionized water. The mole ratios were NMP/NaOH of 1.9:1, $H_2O$/NaOH of 2.2:1, and NaOAc/NaOH of 0.46:1. A dry nitrogen purge was started, heat was applied and 740 mL of water was taken overhead at a final temperature of 183° C. with a final pot temperature of 216° C. The heat was stopped and the agitator was stopped at about 182° C. When the temperature fell to about 154° C., the reactor was filled with nitrogen at about 65 psia (0.45 MPa) to preserve the contents for a subsequent polymerization run.

The next day, the nitrogen pressure was reduced to atmospheric pressure, the reactor was heated to about 171° C. to melt the solidified SMAB composition contained in it and the agitator was started. Hydrogen sulfide amounting to 267 g (7.8 moles) was then charged to the reactor in the vapor phase to the reactor over a 1 hour period keeping the reactor pressure between about 65 to 115 psia (0.5–0.8 MPa) during which period the reactor temperature increased to about 179° C. The hydrogen sulfide was taken up by the composition as evidenced by a drop of pressure to atmospheric (15 psia, 0.10 MPa). At that point, the reactor was charged with 1139.7 (7.75 moles) of p-dichlorobenzene and 500 mL (5.18 moles) of N-methyl-2-pyrrolidone which brought the reactor pressure to 65 psia. The reactor was then heated to 204° C., held there for 2 hours, heated to 266° C. and held there for 2 hours 50 minutes to complete the polymerization. The maximum pressure attained during polymerization was 205 psia (1.41 MPa). The reactor was cooled and the fine white particle size product was recovered, washed 4 times with hot deionized water and dried overnight in a vacuum oven at 93° C. The product weighed 657.7 g and had a melt flow of 257 g/10 minutes, determined by ASTM D1238-70, 316° C., 5 kg weight.

The results presented in Example 3 demonstrate that SMAB can be generated readily according to this invention and the produced SMAB in turn can be reacted with p-dichlorobenzene and hydrogen sulfide in the presence of N-methyl-2-pyrrolidone to produce poly(phenylene sulfide) of an acceptable quality for commercial use.

We claim:

1. A method for preparing alkali metal aminoalkanoate represented by the formula $RNH(CR_2)_nCO_2M$ where each R is selected from among hydrogen, and hydrocarbyl radicals selected from alkyl, cycloalkyl, aryl, and combinations in which the number of carbon atoms in each of the radicals ranges from 1 to about 12, M is an alkali metal selected from sodium, potassium, rubidium, and cesium, n is an integer of 1 to about 12, and the total number of carbon atoms in each molecule of the alkali metal aminoalkanoate is 3 to about 24, by contacting in the presence of an alkali metal carboxylate represented by the formula $R_3CO_2M_1$ where $R_3$ is a hydrocarbyl radical selected from among alkyl, cycloalkyl, aryl, and combinations thereof, said radicals having from 1 to about 20 carbon atoms, and $M_1$ is an alkali metal selected from lithium, sodium, potassium, rubidium, and cesium, a reaction mixture comprising:

(a) at least one alkali metal hydroxide;

(b) water, and (c) at least one lactam.

2. A method of claim 1 wherein compounds are present in the reaction mixture in the mole ratios of 1:1 to 6.5:1 of water:alkali metal hydroxide, 1.5:1 to 8:1 of lactam:alkali metal hydroxide; and 0.05:1 to 1:1 of alkali metal carboxylate:alkali metal hydroxide.

3. A method of claim 1 or 2 wherein the lactam is N-methyl-2-pyrrolidone, the alkali metal carboxylate is sodium acetate, and the alkali metal hydroxide is sodium hydroxide.

4. A method of claim 1 wherein after formation of the alkali metal aminoalkanoate the reaction mixture is dehydrated by distillation at atmospheric pressure.

* * * * *